United States Patent
Fleischmann

(10) Patent No.: US 9,995,760 B2
(45) Date of Patent: Jun. 12, 2018

(54) ROTATIONAL SPEED MEASURING DEVICE FOR A TRANSMISSION AND METHOD FOR MEASURING ROTATIONAL SPEED

(71) Applicant: AUDI AG, Ingolstadt (DE)

(72) Inventor: Hans-Peter Fleischmann, Stammham (DE)

(73) Assignee: AUDI AG, Ingolstadt (DE)

( * ) Notice: Subject to any disclaimer, the term of this patent is extended or adjusted under 35 U.S.C. 154(b) by 252 days.

(21) Appl. No.: 14/903,933

(22) PCT Filed: Jul. 9, 2014

(86) PCT No.: PCT/EP2014/001883
§ 371 (c)(1),
(2) Date: Jan. 8, 2016

(87) PCT Pub. No.: WO2015/003805
PCT Pub. Date: Jan. 15, 2015

(65) Prior Publication Data
US 2016/0169928 A1 Jun. 16, 2016

(30) Foreign Application Priority Data

Jul. 10, 2013 (DE) .................. 10 2013 011 532

(51) Int. Cl.
*G01P 3/36* (2006.01)
*F16H 59/36* (2006.01)
*G01P 3/481* (2006.01)

(52) U.S. Cl.
CPC .............. *G01P 3/36* (2013.01); *F16H 59/36* (2013.01); *G01P 3/481* (2013.01)

(58) Field of Classification Search
CPC . F16H 59/36; F16H 59/46; G01P 3/36; G01P 3/481

(Continued)

(56) References Cited

U.S. PATENT DOCUMENTS 3,824,878 A * 7/1974 Grosseau .......... B60W 30/1819
250/231.13
4,795,278 A * 1/1989 Hayashi .............. B60B 27/0068
310/155

(Continued)

FOREIGN PATENT DOCUMENTS

CN 101449171 A 6/2009
DE 203 07 084 U1 8/2003

(Continued)

OTHER PUBLICATIONS

International Search Report issued by the European Patent Office in International Application PCT/EP2014/001883.

(Continued)

*Primary Examiner* — Mark Hellner
(74) *Attorney, Agent, or Firm* — Henry M Feiereisen LLC

(57) ABSTRACT

A rotational speed measuring device for measuring the rotational speed on coaxially arranged drive shafts is described, wherein a first drive shaft is formed as an inner shaft in a second drive shaft embodied as a hollow shaft. The hollow shaft has at least one opening and a rotational speed encoder which is arranged on the inner shaft and can be detected through the opening of the hollow shaft. A rotational speed sensor is arranged on the outer side of the hollow shaft and is configured to pick up the rotational speed on the rotational speed encoder. A corresponding method for measuring the rotational speed on coaxially arranged drive shafts is also disclosed.

11 Claims, 2 Drawing Sheets

(58) Field of Classification Search
USPC .......................................................... 356/28
See application file for complete search history.

(56) References Cited

U.S. PATENT DOCUMENTS

| | | | |
|---|---|---|---|
| 5,825,176 A * | 10/1998 | Babin | G01P 3/488 |
| | | | 324/174 |
| 8,556,053 B2 | 10/2013 | Jakob Bodenhagen | |
| 8,997,958 B2 | 4/2015 | Schuller et al. | |
| 2005/0057244 A1 | 3/2005 | McCarrick et al. | |
| 2009/0165582 A1 | 7/2009 | Tsunashima et al. | |
| 2009/0188336 A1 | 7/2009 | Fuhrer | |
| 2013/0153356 A1 | 6/2013 | Fleischmann | |
| 2014/0345261 A1 | 11/2014 | Schuller et al. | |
| 2014/0346119 A1 | 11/2014 | Ammler et al. | |
| 2014/0373524 A1 | 12/2014 | Schuller et al. | |

FOREIGN PATENT DOCUMENTS

| | | |
|---|---|---|
| DE | 102 14 478 A1 | 10/2003 |
| DE | 10 2006 023 553 A1 | 11/2007 |
| DE | 10 2011 005 529 A1 | 9/2012 |
| EP | 0 462 435 A1 | 12/1991 |
| EP | 0 747 709 A1 | 12/1996 |
| EP | 2 075 492 A1 | 7/2009 |

OTHER PUBLICATIONS

Chinese Search Report dated Nov. 14, 2017 with respect to counterpart Chinese patent application 201480039143.1.
Translation of Chinese Search Report dated Nov. 14, 2017 with respect to counterpart Chinese patent application 201480039143.1.

* cited by examiner

ROTATIONAL SPEED MEASURING DEVICE FOR A TRANSMISSION AND METHOD FOR MEASURING ROTATIONAL SPEED

CROSS-REFERENCES TO RELATED APPLICATIONS

This application is the U.S. National Stage of International Application No. PCT/EP2014/001883, filed Jul. 9, 2014, which designated the United States and has been published as International Publication No. WO 2015/003805 A2 and which claims the priority of German Patent Application, Serial No. 10 2013 011 532.9, filed Jul. 10, 2013, pursuant to 35 U.S.C. 119(a)-(d).

BACKGROUND OF THE INVENTION

The invention relates to a rotational speed measuring device for a transmission for measuring the rotational speed of coaxially arranged drive shafts and a method for measuring a rotational speed.

In dual-clutch transmissions used in motor vehicles, the switching groups are divided into two sub-transmissions, which are alternately coupled to the drivetrain. The operation and control of the transmission requires detection of the rotational speed of the two sub-transmissions. The drive shafts of the sub-transmissions are often arranged coaxially, wherein a hollow shaft and another shaft enclosed therein form the drive shafts of the sub-transmission.

Such a dual-clutch transmission is known from DE 102 14 478 B4, which has a hollow shaft and another shaft supported therein. To measure a rotational speed on the inner shaft, the inner shaft protrudes from the hollow shaft. A rotational speed encoder and a rotational speed sensor are positioned at the protruding portion of the inner shaft.

SUMMARY OF THE INVENTION

It is the object of the invention to design a rotational speed measuring device for a transmission, preferably for a dual-clutch transmission with coaxially arranged drive shafts, so as to enable a most space-saving rotational speed measurement on the drive shafts.

According to one aspect of the invention, in a rotational speed measuring device for a transmission for measuring the rotational speed of coaxially arranged drive shafts, of which a first drive shaft is enclosed as an inner shaft in a second drive shaft constructed as a hollow shaft, the hollow shaft has at least one opening and a rotational speed encoder which can be detected through the opening of the hollow shaft is arranged on the shaft enclosed in the hollow shaft. The rotational speed of the inner shaft at the rotational speed encoder can thus be tapped or measured with a rotational speed sensor in the region of the opening of the hollow shaft. This allows a very space-saving arrangement of both rotational speed encoders and rotational speed sensors for the inner shaft and the hollow shaft, so that the rotational speed sensors can be mounted in a common sensor housing in a particularly space-saving manner.

Moreover, the rotational speed encoders and the rotational speed sensors can be very flexibly positioned because the opening for the rotational speed measurement at the inner shaft can be arranged along the entire length of the hollow shaft at any desired or optimal position. The rotational speed encoders and the rotational speed sensors can thus be arranged a short distance from an electronic transmission controller.

Advantageously, a plurality of openings for the rotational speed measurement on the inner shaft are provided on the hollow shaft, wherein preferably three openings are provided at equal angular intervals on the hollow shaft. More particularly, a uniform distribution of the openings on the circumference of the hollow shaft does not cause any unbalance. In addition, for sake of stability, a plurality of smaller openings is more advantageous than a comparatively large opening on the hollow shaft.

When the openings are uniformly arranged, they can each extend over an angular range of, for example, at least 30 degrees along the circumference of the hollow shaft, thereby creating an adequate length of the openings and thus an adequate duration for the rotational speed measurement on the inner shaft.

The rotational speed sensor provided for the rotational speed measurement on the inner shaft detects preferably in conjunction with measurement electronics the beginning and the end of the opening passing the rotational speed sensor. Thus, the measurement electronics can measure the rotational speed at the rotational speed encoder of the inner shaft between the beginning and end of the opening, thereby ensuring that in fact only measurement signals originating from the rotational speed encoder of the inner shaft are used for rotational speed measurement.

The rotational speed encoders and the rotational speed sensors for the hollow shaft and the inner shaft can, as already mentioned, be placed close together to save space. Preferably, the two rotational speed sensors are disposed in a common sensor housing. However, the rotational speed sensors for both shafts can also be arranged directly in an already existing transmission controller, thus achieving an extremely space-saving and cost-effective design.

The rotational speed measuring device of the invention is preferably intended for use in a motor vehicle having a dual-clutch transmission with two sub-transmissions which can be alternately coupled to the drive train of the motor vehicle.

It is another object of the invention to provide a method for measuring the rotational speed of coaxial drive shafts of a transmission, preferably a dual-clutch transmission, which allows a space-saving and accurate rotational speed measurement.

According to another aspect of the invention, the rotational speed of a shaft enclosed in the hollow shaft is measured with a rotational speed measuring device through an opening in the hollow shaft, wherein the rotational speed measuring device detects during rotation of the rotating hollow shaft the beginning of the opening passing through the measuring range of the rotational speed measuring device and then begins with the measurement of the rotational speed of the inner shaft. The rotational speed measuring device can detect the beginning of the opening based on a recurring significant change in the measurement signal because the rotational speed sensors detect the rotational speed encoder of the inner shaft when the opening enters the measuring range of the rotational speed sensors, and thereby receive a corresponding sensor signal. However, it is also possible to arrange a separate sensor that detects only the beginning and the end of the passing opening. Determining the beginning of the measurement at the rotational speed encoder of the inner shaft ensures that the rotational speed on the inner shaft is precisely measured. The end of the corresponding measurement period can be calculated as a function of the current rotational speed of the hollow shaft and the circumferential length of the provided openings.

However, the end of the measurement period can also be determined by detecting the end of the passing opening with a sensor.

The rotational speed of the hollow shaft can advantageously be measured with rotational speed sensors that detect the passing openings or the boundaries of the openings as a sensor signal. However, an additional rotational speed encoder can also be mounted a short distance from the one or more openings provided on the hollow shaft, where rotational speed sensors tap the rotational speed of the hollow shaft. Using a separate rotational speed encoder advantageously provides a slightly higher measurement accuracy, since a rotational speed encoder can provide a correspondingly higher number of measurement pulses for the rotational speed measurement.

BRIEF DESCRIPTION OF THE DRAWING

The invention will now be described with reference to exemplary embodiments shown in the drawing, which shows in.

DETAILED DESCRIPTION OF PREFERRED EMBODIMENTS

Figure 1:
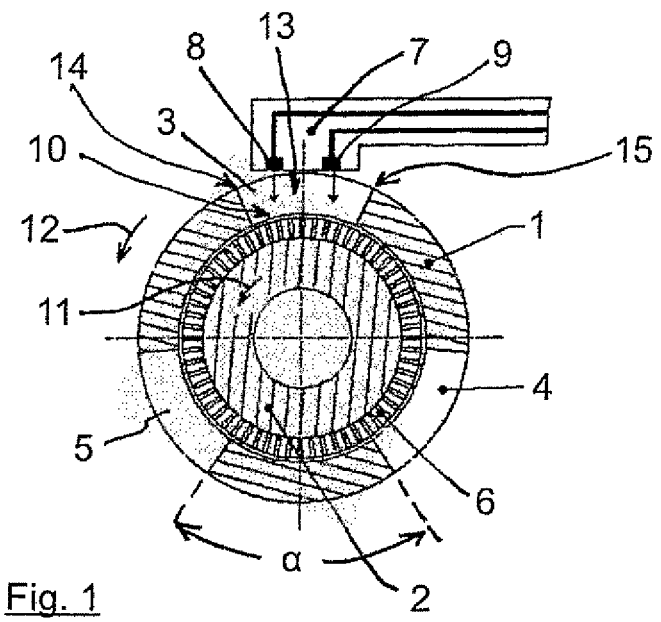
FIG. 1 a cross-section in the area of the drive shafts of a dual-clutch transmission of a motor vehicle, FIG. 2 a longitudinal section of coaxially arranged drive shafts of a dual-clutch transmission, and FIG. 3 a rotational speed measuring device with rotational speed sensors on a hollow shaft and a shaft of a dual-clutch transmission enclosed in the hollow shaft.

The sectional view of FIG. 1 shows a shaft 2 enclosed in a hollow shaft 1, which are drive shafts of an unillustrated dual-clutch transmission. The coaxially arranged shafts 1, 2 can be selectively connected to a drive train of a motor vehicle by way of the dual-clutch transmission, which is known per se and not the subject matter of the present invention.

A total of three openings 3 to 5 are arranged on the hollow shaft at equal angular intervals α. In addition, each opening 3 to 5 is formed as an elongated hole with identical circumferential length and hence also with the same aperture angle.

A rotational speed encoder 6, whose rotational speed is measured with a rotational speed sensor 7 arranged outside of the hollow shaft 1, is affixed on the inner shaft 2. The rotational speed sensor 7 may be formed as an optical sensor having two optical elements 8, 9, which scan an optical raster 10 arranged on the rotational speed encoder 6, wherein the optical raster 10 may be composed of grooves, teeth or another optically scannable subdivision.

When the two shafts 1 and 2 rotate in accordance with the directions of arrows 11, 12, the openings 3 to 5 pass sequentially the measuring range 13 located below the rotational speed sensor 7. As soon as the respective opening, in this case the opening 3, enters the measuring range 13, the rotational speed sensor 7 can measure the rotational speed of the inner shaft 2 at the rotational speed encoder 6, until such time as the opening 3 leaves the measuring range 13 again. The beginning of the measurement period, during which the rotational speed sensor 7 can measure the rotational speed at the rotational speed encoder 6 is defined by the beginning 14 and the end 15 and the rotational speed of the hollow shaft 1. A measuring electronics (not shown in FIG. 1) can determine the measurement period based on the rotational speed of the hollow shaft 1, as long as the diameter and the circumferential length of the respective opening 3 to 5 are known. However, the beginning and end of the measurement period can in principle also be determined with sensors by detecting with the sensors when the respective opening 3 to 5 enters the measurement region 13. Likewise, the end of the measurement period can then also be determined with sensors.

Figure 2:
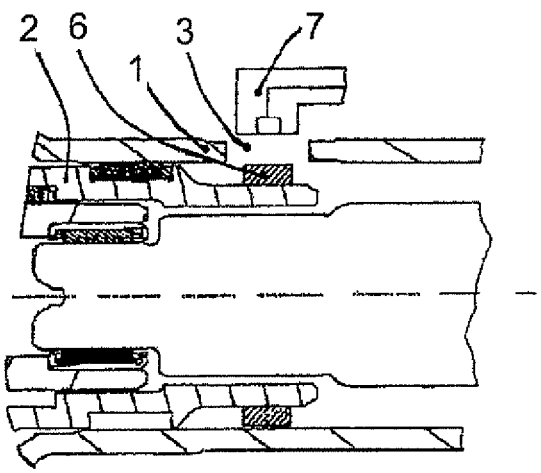

The diagram of FIG. 2 shows a hollow shaft 1 with an inner shaft 2. The opening 3 in. FIG. 2 is located in the upper position in which the rotational speed sensor 7 can scan the rotational speed encoder 6 mounted on the inner shaft 2.

Figure 3:
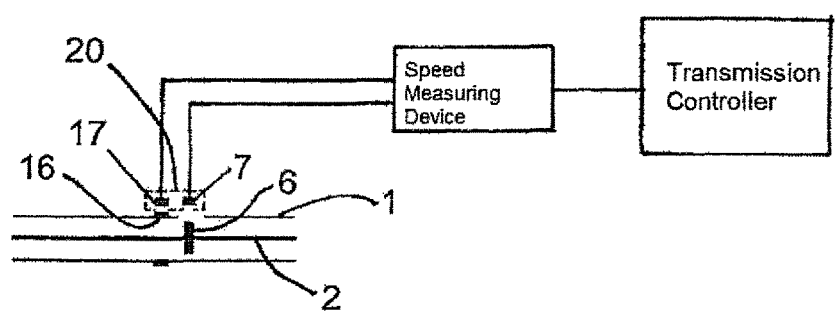

The schematic diagram of FIG. 3 shows a hollow shaft 1 with an inner shaft 2, on which juxtaposed sensors 7, 17 are arranged in close proximity. In correspondence with the rotational speed sensors 7, 17, a rotational speed encoder 6 is disposed on the inner shaft 2 and an additional rotational speed encoder 16 is disposed on the hollow shaft 1.

The sensor signals detected by the rotational speed sensors 7, 17 are transmitted to a measuring electronics, which is referred to herein as a rotational speed measuring device 18. The rotational speed measuring device 18 evaluates the sensor signals received from the rotational speed sensors 7, 17 and determines therefrom the rotational speeds of the hollow shaft 1 and the inner shaft 2 and transmits the rotational speeds to a transmission controller 19.

The rotational speed sensors 7, 17 are, as outlined in FIG. 3, combined in a common sensor housing 20. However, the rotational speed sensors 7, 17 may in conjunction with the rotational speed measuring device 18 and the transmission controller 19 also form a measurement unit that is arranged on or in a dual-clutch transmission of a motor vehicle.

The invention claimed is:

1. A rotational speed measuring device for measuring a rotational speed of coaxially arranged drive shafts of a transmission, comprising:
    a rotational speed encoder arranged on an inner one of the drive shafts detectable through an opening in an outer one of the drive shafts constructed as a hollow shaft and enclosing the inner drive shaft;
    a rotational speed sensor arranged outside the hollow shaft and configured to tap the rotational speed at the rotational speed encoder through the opening; and
    a measuring electronics operatively connected to the rotational speed sensor and configured to detect, when the hollow shaft rotates, a beginning and an end of the opening passing the rotational speed sensor,
    wherein the opening extends over an angular range of at least 30 degrees on the circumference of the hollow shaft.

2. The rotational speed measuring device of claim 1, comprising three openings disposed at equal angular distances on the circumference of the hollow shaft.

3. A rotational speed measuring device for measuring a rotational speed of coaxially arranged drive shafts of a transmission, comprising:
    a rotational speed encoder arranged on an inner one of the drive shafts detectable through an opening in an outer one of the drive shafts constructed as a hollow shaft and enclosing the inner drive shaft;
    a rotational speed sensor arranged outside the hollow shaft and configured to tap the rotational speed at the rotational speed encoder through the opening;
    a measuring electronics operatively connected to the rotational speed sensor and configured to detect, when the hollow shaft rotates, a beginning and an end of the opening passing the rotational speed sensor,
    an additional rotational speed encoder and an additional rotational speed sensor arranged on the hollow shaft for measuring the rotational speed of the hollow shaft, the additional rotational speed encoder and the additional rotational speed sensor being arranged in close proximity of the rotational speed encoder and the rotational speed sensor of the inner shaft.

4. The rotational speed measuring device of claim 3, further comprising a common sensor housing configured to accommodate, the rotational speed sensor and the additional rotational speed sensor together with the hollow shaft.

5. The rotational speed measuring device of claim 4, further comprising a transmission controller configured to accommodate the rotational speed sensor and the additional rotational speed sensor with associated measurement electronics.

6. The rotational speed measuring device of claim 1, wherein the transmission is a dual-clutch transmission comprising two sub-transmissions which are configured to be alternately coupled to a drivetrain of a motor vehicle.

7. A method for rotational speed measurement of coaxially arranged drive shafts of a transmission having an outer hollow shaft and an inner shaft enclosed by the outer shaft, the method comprising:
 measuring with a rotational speed measuring device through at least one opening disposed in the outer shaft a rotational speed of the inner shaft by
 detecting with the rotational speed measuring device, while the hollow shaft rotates, a beginning and an end of the at least one opening passing through a measuring range of the rotational speed measuring device,
 beginning a measurement of the rotational speed of the inner shaft, and
 continuing the measurement until the end of the at least one opening is detected,
 wherein the rotational speed measurement device terminates the measurement of the rotational speed after the end of the at least one opening passing through the measuring range.

8. A method for rotational speed measurement of coaxially arranged drive shafts of a transmission having an outer hollow shaft and an inner shaft enclosed by the outer shaft, the method comprising:
 measuring with a rotational speed measuring device through at least one opening disposed in the outer shaft a rotational speed of the inner shaft by
 detecting with the rotational speed measuring device, while the hollow shaft rotates, a beginning and an end of the at least one opening passing through a measuring range of the rotational speed measuring device,
 beginning a measurement of the rotational speed of the inner shaft, and
 continuing the measurement until the end of the at least one opening is detected,
 wherein the rotational speed measuring device determines when the end of the at least one opening passes through the measuring range by way of a calculation that takes into account the rotational speed and a diameter of the hollow shaft and a circumferential length or an aperture angle of the opening.

9. A method for rotational speed measurement of coaxially arranged drive shafts of a transmission having an outer hollow shaft and an inner shaft enclosed by the outer shaft, the method comprising:
 measuring with a rotational speed measuring device through at least one opening disposed in the outer shaft a rotational speed of the inner shaft by
 detecting with the rotational speed measuring device, while the hollow shaft rotates, a beginning and an end of the at least one opening passing through a measuring range of the rotational speed measuring device,
 beginning a measurement of the rotational speed of the inner shaft, and
 continuing the measurement until the end of the at least one opening is detected,
 wherein the openings disposed on the hollow shaft form a rotational speed encoder for measuring the rotational speed of the hollow shaft.

10. The rotational speed measuring device of claim 3, comprising three openings disposed at equal angular distances on the circumference of the hollow shaft.

11. The rotational speed measuring device of claim 3, wherein the transmission is a dual-clutch transmission comprising two sub-transmissions which are configured to be alternately coupled to a drivetrain of a motor vehicle.

* * * * *